United States Patent
Bazzi et al.

(10) Patent No.: US 10,666,464 B2
(45) Date of Patent: May 26, 2020

(54) MITIGATING INTER-CELL PILOT INTERFERENCE VIA NETWORK-BASED GREEDY SEQUENCE SELECTION AND EXCHANGE

(71) Applicant: HUAWEI TECHNOLOGIES CO., LTD., Shenzhen, Guangdong (CN)

(72) Inventors: Samer Bazzi, Munich (DE); Wen Xu, Munich (DE)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 91 days.

(21) Appl. No.: 15/955,477

(22) Filed: Apr. 17, 2018

(65) Prior Publication Data
US 2018/0234268 A1    Aug. 16, 2018

Related U.S. Application Data

(63) Continuation of application No. PCT/EP2015/074189, filed on Oct. 19, 2015.

(51) Int. Cl.
*H04L 25/02* (2006.01)
*H04L 5/00* (2006.01)
(Continued)

(52) U.S. Cl.
CPC ....... *H04L 25/0242* (2013.01); *H04B 7/0626* (2013.01); *H04J 11/0056* (2013.01);
(Continued)

(58) Field of Classification Search
CPC . H04L 25/0242; H04L 5/0073; H04L 5/0091; H04L 27/2613; H04L 25/021;
(Continued)

(56) References Cited

U.S. PATENT DOCUMENTS

| 10,524,292 B2 * | 12/2019 | Wu ........................ H04W 74/08 |
| 2009/0047969 A1 * | 2/2009 | Lee ........................ H04L 5/0048 |
|  |  | 455/446 |

(Continued)

FOREIGN PATENT DOCUMENTS

| CN | 101179540 A | 5/2008 |
| CN | 102821392 A | 12/2012 |

OTHER PUBLICATIONS

T. L. Marzetta, "Noncooperative cellular wireless with unlimited numbers of base station antennas", IEEE Trans. Wir. Comm., vol. 9, No. 11, pp. 3590-3600, Nov. 2010.

(Continued)

*Primary Examiner* — Will W Lin
(74) *Attorney, Agent, or Firm* — Womble Bond Dickinson (US) LLP

(57) ABSTRACT

Allocation of CSI-RS or CSI pilot sequences among cells in a cooperative manner to reduce pilot inter-cell interference. Sequences in each cell occupy the same time slot, multiple subcarrier frequencies, and are orthogonal in time via properly chosen cyclic shifts. Sequences in multiple cells are chosen from a pool of non-orthogonal yet distinguishable sequences through their root indices. Exchanging root indices among cells allows a given cell to reconstruct sequences used in neighboring cells and to estimate interfering channels as the number of channel taps is usually limited, thus mitigating pilot contamination. Furthermore, a greedy selection algorithm to find combinations of sequences that further reduce the channel estimation mean-square-error is proposed.

13 Claims, 4 Drawing Sheets

(51) Int. Cl.
  *H04J 11/00* (2006.01)
  *H04L 27/26* (2006.01)
  *H04B 7/06* (2006.01)
  *H04J 13/00* (2011.01)
(52) U.S. Cl.
  CPC ........ *H04J 13/0062* (2013.01); *H04L 5/0048* (2013.01); *H04L 5/0073* (2013.01); *H04L 5/0091* (2013.01); *H04L 25/021* (2013.01); *H04L 27/2613* (2013.01)
(58) Field of Classification Search
  CPC . H04L 5/0048; H04J 11/0056; H04J 13/0062; H04B 7/0626
  See application file for complete search history.

(56) References Cited

U.S. PATENT DOCUMENTS

| | | | |
|---|---|---|---|
| 2010/0091755 A1* | 4/2010 | Kwon | H04L 5/0007 370/344 |
| 2012/0051265 A1 | 3/2012 | Shen et al. | |
| 2016/0227578 A1* | 8/2016 | Lee | H04W 74/004 |
| 2016/0352539 A1* | 12/2016 | Dhakal | H04L 25/0256 |
| 2017/0373807 A1* | 12/2017 | Hessler | H04L 5/005 |
| 2018/0175960 A1* | 6/2018 | Fodor | H04B 7/024 |
| 2018/0206157 A1* | 7/2018 | Zhu | H04W 24/10 |

OTHER PUBLICATIONS

F. Rusek, D. Persson, B. K. Lau, E. G. Larsson, T. L. Marzetta, O. Edfors, and F. Tufvesson, "Scaling up MIMO: opportunities and challenges with very large arrays," IEEE Signal Processing Magazine, vol. 30, No. 1, pp. 40-60, Jan. 2013.
T. L. Marzetta, "How much training is required for multiuser MIMO?," in Proc. of the 40th Asilomar Conference on Signals, Systems, and Computers, Pacific Grove, California, USA, Oct/Nov. 2006.,total 5 pages.
3GPP TS 36.211 V12.7.0 (Sep. 2015),3rd Generation Partnership Project;Technical Specification Group Radio Access Network;Evolved Universal Terrestrial Radio Access (E-UTRA);Physical channels and modulation(Release 12),total 136 pages.
D. C. Chu, "Polyphase codes with good periodic correlation properties," IEEE Trans. Inf. Theory, vol. 18, No. 4, pp. 531-532, Jul. 1972.
E. Dahlman, S. Parkvall, and J. Sköld, 4G: LTE/LTE-Advanced for Mobile Broadband. Academic Press, 2nd edition, 2014,total 13 pages.
I. Maniatis et al., "Pilots for joint channel estimation in multi-user OFDM mobile radio systems," in Proc. of the 7th IEEE Int. Symp. on Spread-Spectrum Tech. /and Appl. (ISSSTA '02), vol. 1, pp. 44-48.
S. M. Kay, Fundamentals of Statistical Signal Processing: Estimation Theory, Prentice Hall, 1993,total 303 pages.
T. H. Cormen et al., Introduction to Algorithms. MIT Press, 3rd edition, 2009.,total 1313 pages.
A. Molisch,"Wireless Communications". John Wiley and Sons Ltd, 2nd edition, 2011.
H. Yin et al., "A coordinated approach to channel estimation in large-scale multiple-antenna systems," IEEE Journal Selec. Areas in Comm., vol. 31, issue 2, pp. 264-273, Feb. 2013.
D. Neumann et al., "Suppression of pilot contamination in massive MIMO systems," in Proc. of the 15th IEEE International Symposium on Signal Processing Advances in Wireless Communications (SPAWC), Jun. 2014, 5 pages.
A. Ashikhmin and T. L. Marzetta, "Pilot contamination precoding in multicell large scale antenna systems," in Proc. of the 2012 IEEE International Symposium on Information Theory (ISIT), Jul. 2012, 5 pages.
H. Huh et al., "Achieving "massive MIMO" spectral efficiency with a not-so-large number of antennas," IEEE Trans. Wir. Comm., vol. 11, No. 9, pp. 3226-3239, Sep. 2012.
R. R. Mueller et al., "Blind pilot decontamination," IEEE Select. Top. Sig. Proc, vol. 8, No. 5, pp. 773-786, Oct. 2014.
A. Hu et al., "Pilot design for large-scale multi-cell multiuser MIMO systems," in Proc. of the 2013 IEEE International Conference on Communications (ICC), Jun. 2013, 5 pages.
G. Kang et al., "Pilot design for inter-cell interference mitigation in MIMO OFDM systems," IEEE Comm. Letters, vol. 11, No. 3, pp. 237-239, Mar. 2007.
J. W. Kang et al., "Optimal pilot sequence design for multi-cell MIMO-OFDM systems," IEEE Trans. Wir. Comm., vol. 10, No. 10, pp. 3354-3367, Oct. 2011.
XP011614526 Samer Bazzi et al.,"Mitigating Inter-Cell Pilot Interference via Network-Based Greedy Sequence Selection and Exchange", IEEE Wireless Communications Letters ( Volume: 5 , Issue: 3 , Jun. 2016 ), 4 pages.
R1-092584 WOASiS, "Downlink Multi-Cell Demodulation Reference Signal Design", 3GPP TSG-RAN WG1 #57bis, Los Angeles, CA, USA, Jun. 29-Jul. 3, 2009, 7 pages.
R1-094704 Huawei, "Further design and evaluation on CSI-RS for LTE-A", 3GPP TSG RAN WG1 meeting #59, Jeju, Korea, Nov. 9-13, 2009, total 8 pages.
R1-100498 NTT DOCOMO,"CSI-RS Inter-cell Design Aspects", 3GPP TSG RAN WG1 Meeting #59bis,Valencia, Spain, Jan. 18-22, 2010, total 3 pages.

* cited by examiner

Algorithm 1 Greedy Sequence Selection
Require: Random root index $r_1$ and initial $s_1 = \tilde{a}_L^{r_1}$
  $S \leftarrow s_1$
  for $q = 2$ to $K$ do
    index $\leftarrow 1$
    $\epsilon_q = 0_{L-q}$
    for $r_q = 1$ to $L-1$, $\tilde{a}_L^{r_q} \notin S$ do
      Calculate $[\epsilon_q]_{\text{index}}$, the channel estimation MSE assuming there are $q$ users in the system using the sequence set $S \cup \tilde{a}_L^{r_q}$ {cf. equations (12) and (11)}.
      index $\leftarrow$ index $+ 1$
    end for
    Select the root index $r_q^*$ that minimizes $\epsilon_q$
    $S \leftarrow S \cup \tilde{a}_L^{r_q^*}$
  end for

Fig. 3

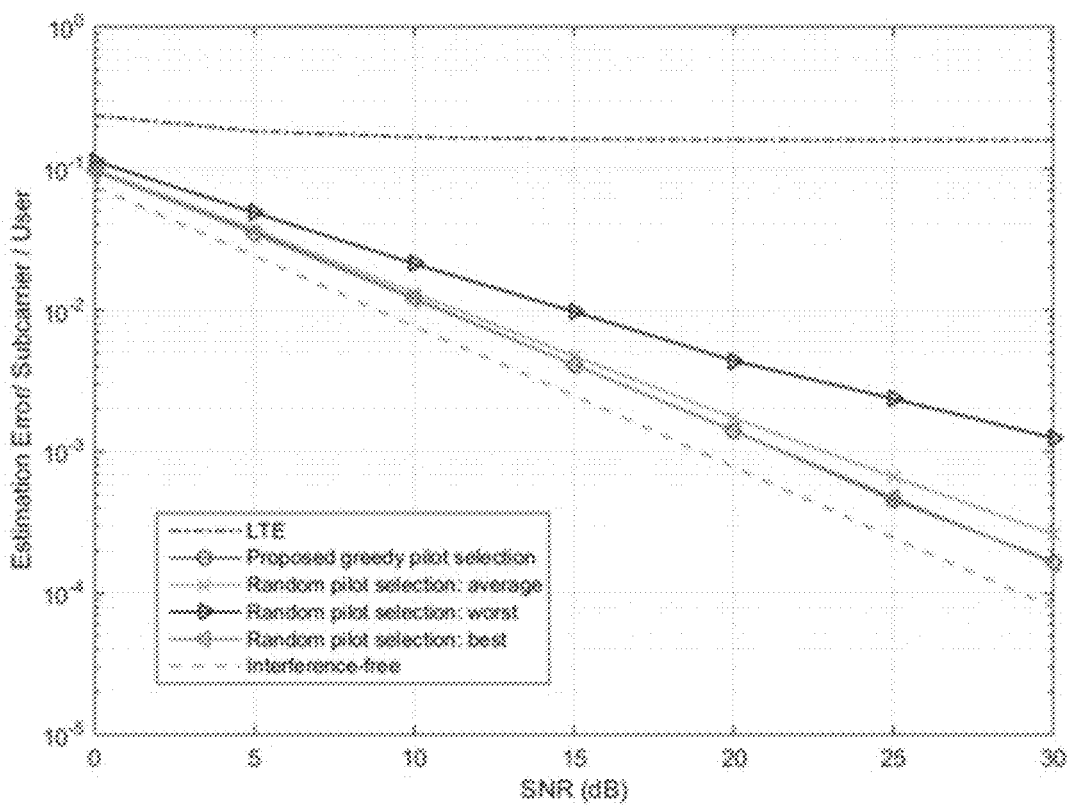

Fig. 4

MITIGATING INTER-CELL PILOT INTERFERENCE VIA NETWORK-BASED GREEDY SEQUENCE SELECTION AND EXCHANGE

CROSS-REFERENCE TO RELATED APPLICATIONS

This application is a continuation of International Application No. PCT/EP2015/074189, filed on Oct. 19, 2015, the disclosure of which is hereby incorporated by reference in its entirety.

TECHNICAL FIELD

The present application generally relates to the field of wireless communication, and specifically relates to channel state information (CSI) and to channel estimation on the basis of pilot sequences in multi-cell systems.

BACKGROUND

To meet the growing demand of high rate wireless data transmission, transmitters with large numbers of antennas and serving a multitude of users (massive MIMO systems) are currently advocated for future wireless cellular systems. One possible application of such a scenario is the downlink (DL) of the 3rd Generation Partnership Project (3GPP) Long Term Evolution (LTE)/LTE-Advanced. One of the main challenges in multi-input multi-output (MIMO) and massive MIMO operation is acquiring accurate channel state information (CSI) at the base station (BS) to perform beamforming or precoding operations. In LTE systems, this is performed by sending predefined signals—pilots or pilot sequences—that are used for channel estimation.

Future 5G systems will utilize frequency spectrum efficiently and will move towards a frequency reuse of 1. This implies the pilots of a desired user will suffer from inter-cell pilot interference when the pilots of users in neighboring cells are scheduled on the same time and frequency resources as those of the pilots of the desired user. This interference degrades the CSI quality at the BS. Designing pilot sequences that are orthogonal across any number of cells is fundamentally not possible. Therefore, pilot sequences are usually limited to be orthogonal within one cell and one has to devise new solutions to mitigate inter-cell pilot interference.

The inter-cell pilot interference problem is especially severe for cell-edge users, since the power of interfering pilots is comparable to the power of desired pilots.

One possible scenario where inter-cell pilot interference is detrimental is in time-division-duplex (TDD) mode. Here, due to channel reciprocity, the transmitter can estimate the CSI of desired users based on pilots sent by these users in the uplink (UL) and use these estimates to perform beamforming or precoding in the DL. However, UL inter-cell pilot interference deteriorates the CSI quality at the BS and leads to mismatched precoders which deteriorate the DL performance in TDD mode. Another scenario that applies to both TDD and frequency-division-duplex (FDD) mode is in the context of UL data transmission. Here, UL inter-cell pilot interference deteriorates the quality of the UL CSI necessary at the BS to decode/demodulate the symbols sent by desired users.

LTE uses following procedures to randomize interference to other cells. Firstly according to a sequence-group hopping, the sequence used in a given cell depends on a group hopping pattern and a sequence shift pattern. In this respect, there are 17 hopping patterns/groups and 30 shift patterns. Further on, a cluster of up to 30 cells can belong to the same hopping group, and cells within the cluster are differentiated via the shift pattern. Secondly according to a cyclic shift hopping, a cell specific cyclic shift is added on top of UE specific cyclic shifts. It is important to note that LTE thereby is only able to randomize interference to other cells.

SUMMARY

Having recognized the above-mentioned disadvantages and problems, the present application aims at improving the state of the art. In particular, the object of the present application is to mitigate inter-cell pilot interference.

The above-mentioned object of the present application is achieved by the solution provided in the enclosed independent claims. Advantageous implementations of the present application are further defined in the respective dependent claims.

A first aspect of the present application provides a controller for inter-cell pilot interference mitigation in a mobile network comprising a plurality of base stations for serving user equipments in respective cells. A different set of pilot sequences is used by each base station for estimating channel state information, CSI, of user equipments served by said base station. The controller comprises a transmitting unit adapted to transmit information about the set of pilot sequences used by a first base station of the network to at least a sec and base station of the network.

Thereby, the application proposes a mufti-cell cooperation allowing for the second base station to estimate the CSI of user equipments in other cells and mitigating inter-cell pilot interference, and particularly to estimate the CSI of user equipments in the cell served by the first base station.

The controller is part of the network and particularly may be distinct from the base stations of the network or may be part of one base station.

In an implementation form of the controller according to the first aspect, the set of pilot sequences used by each base station is identified by a sequence identification parameter, and the transmitting unit is adapted to transmit information about the set of pilot sequences used by the first base station to the second base station of the network in that:
  the transmitting unit is adapted to transmit the sequence identification parameter identifying the set of pilot sequences used by the first base station to the second base station.

In an implementation form of the controller according to the first aspect, the set of pilot sequences used by each base station is composed of Zadoff-Chu sequences comprising a root sequence and cyclically shifted versions of the root sequence, said root sequence being identified by a root index. The transmitting unit is adapted to transmit the sequence identification parameter identifying the set of pilot sequences used by the first base station to the second base station in that:
  the transmitting unit is adapted to transmit the root index identifying the root sequence used by the first base station to the second base station.

In an implementation form of the controller according to the first aspect, the set of pilot sequences used by each base station is composed of M-Sequences, Gold sequences or Kasami sequences. The sequence identification parameter identifies the set of pilot sequences used by the first base station in that the set of pilot sequences used in the first base station can be generated from the sequence identification parameter.

Thereby, it is possible for the second base station to reconstruct the set of pilot sequences used by the first base station.

In an implementation form of the controller according to the first aspect, the transmitting unit is adapted to transmit the sequence identification parameter identifying the set of pilot sequences used by the first base station to the second base station in that:
the transmitting unit is adapted to transmit indices of the set of pilot sequences used by the first base station to the second base station.

In an implementation form of the controller according to the first aspect, the controller comprises a selection unit adapted to select a first set of K sequence identification parameters from a second set of possible sequence identification parameters, K corresponding to the number of base stations and to the number of cells of the network, and an assignment unit adapted to assign a distinct sequence identification parameter from the first set to each of the K base stations of the network.

In an implementation form of the controller according to the first aspect, the selection unit is adapted to select the set of sequence identification parameters by means of a greedy algorithm comprising:
an initial phase comprising selecting a first sequence identification parameter $r_k$ from the second set, initializing the first set with the first sequence identification parameter, and removing the first sequence identification parameter from the second set, and
a recursive phase comprising selecting the sequence identification parameter $r_q$ of the second set that minimizes a joint mean-square-error filter $\in_q$, adding the selected sequence identification parameter $r_q$ to the first set, and removing the selected sequence identification parameter $r_q$ from the second set,
wherein the joint mean-square-error filter $\in_q$ is defined as:

$$\epsilon_q = tr\left(\left(\frac{1}{\sigma_n^2}M_q^H M_q + C_{h_{1:q,td}}^{-1}\right)^{-1}\right)$$

wherein q corresponds to the q-th step of the recursive phase,
$M_q$ is a time frequency transfer function M defined by:
$$M_q \triangleq (S_1\tilde{F}, \ldots, S_q\tilde{F})$$

$S_k$ is a diagonal matrix containing the elements of the respective sequence sk identified by the sequence identification parameter, and
$\tilde{F}$ is a matrix comprising first T entries of the L rows of a Fourier matrix $F_N$ corresponding to the L subcarriers occupied by the pilot sequences, T being a number of taps, and wherein $C_{1:q,td}^{-1}$ is the inverse of the covariance matrix of $(h_{1,td}^H, \ldots, h_{q,td}^H)^H$.
$h_{k,td}$ is a channel impulse response, CIR, of a user equipment served by a base station k, of length T, $\sigma_n^2$ is the power of the additive noise present at the selection unit, and tr(.) denotes the trace of a matrix.

Thereby, K is the number of cooperating cells while k refers to the index of a cooperating cell Thus, depending on the q-th step of the recursive phase, k takes values 1, 2, 3, . . . , q, and at the end of the recursive phase k takes the values 1, 2, 3, . . . , K. As each user is mapped to a serving base station or serving cell, k also refers to the user which is served by base station k. Indeed, we consider one user per cell when describing the application: the pilot-interference corrupting the channel estimate of a given user in a given cell comes from the one user in each of the other cells that transmits its pilots with the same phase rotation as that given user.

A second aspect of the present application provides a base station for serving user equipments in a cell of a mobile network. The network comprises further base stations for serving user equipments in respective further cells, wherein a different set of pilot sequences is used by each base station for estimating channel state information, CSI, of user equipments served by said base station. The base station comprises a receiving unit adapted to receive information about the sets of pilot sequences used respectively by further base stations of the network.

In an implementation form of the base station according to the second aspect, the set of pilot sequences used by each base station is identified by a sequence identification parameter, and
the receiving unit is adapted to receive information about the sets of pilot sequences used respectively by further base stations of the network in that:
the receiving unit is adapted to receive the sequence identification parameters respectively identifying the sets of pilot sequences used by the further base stations.

In an implementation form of the base station according to the second aspect, the set of pilot sequences used by each base station is composed of Zadoff-Chu sequences comprising a root sequence $s_k$ and cyclically shifted versions of the root sequence, said root sequence $s_k$ being identified by a root index $r_k$, wherein the receiving unit is adapted to receive the sequence identification parameters respectively identifying the sets of pilot sequences used by the further base stations of the network in that:
the receiving unit is adapted to receive the root indices rk identifying the respectively root sequence $s_k$ used by the further base stations.

In an implementation form of the base station according to the second aspect, the set of pilot sequences used by each base station is composed of M-Sequences, Gold sequences or Kasami sequences, and wherein the sequence identification parameter identifies the set of pilot sequences used by a given base station in that the set of pilot sequences used in the given base station can be generated from the sequence identification parameter.

In an implementation form of the base station according to the second aspect, the receiving unit is adapted to receive an L-dimensional frequency-domain signal y comprising pilot sequences received from user equipments located in the cell served by the base station and in the further cells, wherein L is the length of the pilot sequences which are spread over L subcarriers. The base station comprises a computing unit adapted to perform, for the user equipments located in the cell served by the base station and in the further cells, a joint channel estimation in the time domain.

In an implementation form of the base station according to the second aspect, the computing unit is adapted to generate, for each received sequence identification parameter rk, the sequence $s_k$ of length L identified by the sequence identification parameter $r_k$,
wherein the computing unit is adapted to generate a time frequency transfer function M defined by:

$$M \triangleq (S_1\tilde{F}, \ldots, S_K\tilde{F})$$

wherein $S_k$ is a diagonal matrix containing the elements of the respectively generated sequence sk, and $\tilde{F}$ is a matrix comprising the first T entries of the L rows of a Fourier matrix $F_N$ corresponding to the L subcarriers occupied by the pilot sequences, T being a number of taps, wherein the computing unit is adapted to perform the joint channel estimation by solving a linear system of L equations defined by:

$$y = M h_{td} + n$$

wherein y is the frequency-domain signal received by the receiving unit, $h_{td}$ is defined as:

$$h_{td} = (h_{1,td}^H, \ldots, h_{K,td}^H)^H$$

wherein K is the number of cells comprising the cell served by the base station and the further cells, $h_{k,td}$ is a channel impulse response, CIR, of a user equipment served by a base station k.

In an implementation form of the base station according to the second aspect, the computing unit is adapted to perform the joint channel estimation by optimizing an estimation filter G defined as:

$$G = (M^H M + \sigma_n^2 C_{h_{td}}^{-1})^{-1} M^H$$

wherein $C_{h_{td}}$ is the covariance matrix of $h_{k,td}$, and $\sigma_n^2$ is the power of the additive noise present at the selection unit.

In an implementation form of the base station according to the second aspect, the base station comprises a broadcast unit adapted to broadcast information about the set of pilot sequences used by the base station to the user equipments served by the base station.

The further aspects related to the controller according to the first aspect of the application also applies to the base station according to the second aspect.

A third aspect of the present application provides a method for inter-cell pilot interference mitigation in a mobile network comprising a plurality of base stations for serving user equipments in respective cells, wherein a different set of pilot sequences is used by each base station for estimating channel state information, CSI, of user equipments served by said base station. The method comprises transmitting information about the set of pilot sequences used by a first base station of the network to at least a second base station of the network.

The further aspects related to the controller according to the first aspect of the application also applies to the method according to the third aspect.

A fourth aspect of the present application provides a method for a base station to serve user equipments in a cell of a mobile network, wherein the network comprises further base stations for serving user equipments in respective further cells. A different set of pilot sequences is used by each base station for estimating channel state information, CSI, of user equipments served by said base station. The method comprises: the base station receives information about the sets of pilot sequences used respectively by further base stations of the network.

The further aspects related to the base station according to the second aspect of the application also applies to the method according to the fourth aspect.

A fifth aspect of the present application provides a computer program having a program code for performing the method according to the third or fourth aspect, when the computer program runs on a computing device.

The application particularly proposes to follow the LTE UL frame format for pilot sequences as an example. However, the application can also be employed in other systems. In LTE UL, user pilot sequences in each cell occupy the same symbol slot in time but span multiple subcarrier frequencies, and are orthogonal in time via properly chosen cyclic shifts. Spanning the pilot sequences in frequency has the property that the larger the number of occupied subcarriers, the larger the sequence length and number of available sequences. For instance, if Zadoff-Chu (ZC) sequences are considered, the number of root sequences is proportional to the length of the sequences, and each root sequence is distinguishable by its root index. It is referred to the available sequences as the pool of sequences. Sequences belonging to this pool are not orthogonal Sequences in multiple cells are chosen from this pool. The application consists of two main parts.

A main aspect of the application relates to an exchange of sequences, e.g. root indices of ZC sequences, among base stations. This allows each BS to know which pilot sequences are used by users in neighboring cells and to perform joint estimation of desired and interfering links' CSI in time as the total number of channel taps is usually limited in practice. Knowledge of the CSI of user links in neighboring cells may be important for, e.g., UL or DL CoMP applications. The base stations that exchange the sequences indices or know the used indices of the sequences in neighboring cells via a central controller are referred to as cooperating base stations.

A further main aspect of the application relates to a greedy selection algorithm that finds good combinations of sequences that ensure a low channel estimation mean-square-error (MSE) for a given sequence length and number of cooperating base stations. This is especially important in broadband applications where sequences span a large number of subcarriers and where the pool of available sequences is large. In such scenarios, sequence selection can bring considerable benefits.

In comparison to the state of the art, e.g. standardized in LTE, the proposed exchange of sequences improves CSI quality considerably. Additionally, the proposed greedy selection algorithm brings an additional 1 to 5 dB power gain on average in the medium to high signal-to-noise-ratio (SNR) regime, compared to the case where sequences are randomly assigned by the network or randomly chosen by the cells. The gain obtained by the greedy selection can be used to either further improve the CSI quality or reduce the pilot power transmission required to achieve a given estimation MSE. Furthermore, the greedy selection ensures that bad sets of sequences are excluded, wherein bad sets are the sets that cause higher channel estimation MSEs. The performance of such sets can be more than 10 dB worse than the performance of the ones returned by the greedy procedure at high SNR.

The matrices M and M_q proposed by the present application apply to orthogonal-frequency-division-duplex (OFDM) or OFDM-like (multicarrier) systems.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by external entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present application will be explained in the following description of specific embodiments in relation to the enclosed drawings, in which FIG. 3 shows an embodiment of a greedy sequence selection according to the present application, FIG. 4 shows an estimation error/subcarrier/user as a function of the SNR according to an embodiment of the application.

DETAILED DESCRIPTION OF EMBODIMENTS

Figure 1:
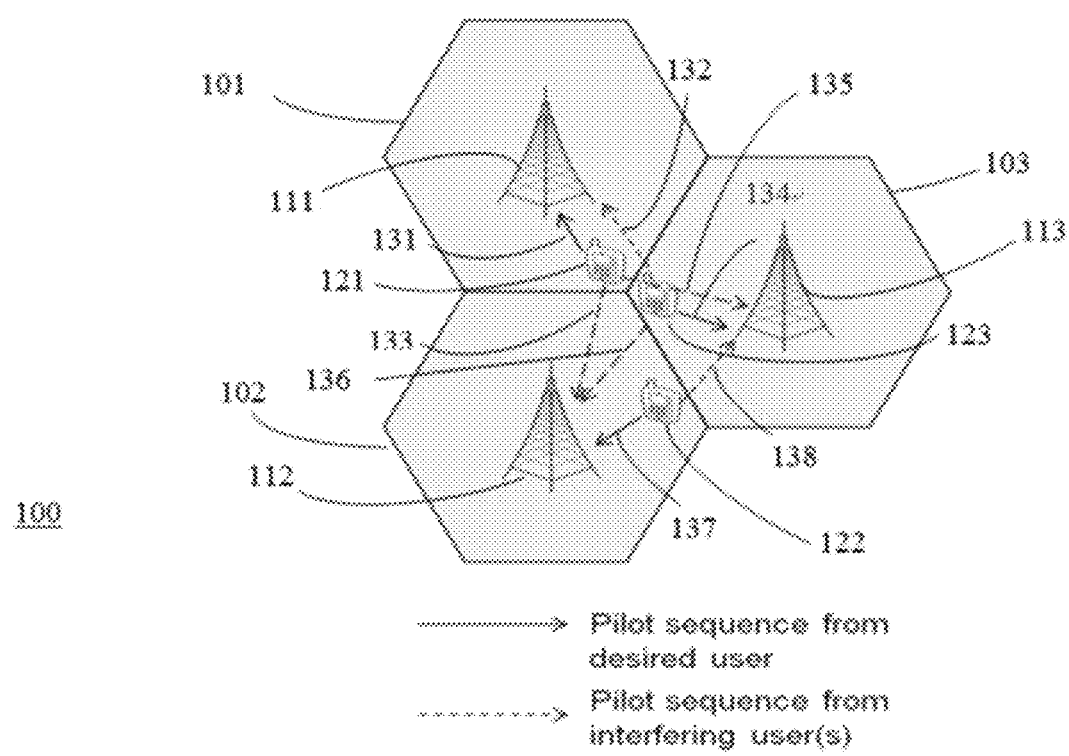
FIG. 1 shows an embodiment of a mufti-cell communication system according to the present application.

FIG. 1 shows an embodiment of a mobile network or mufti-cell communication system according to the present application.

The system 100 comprises a plurality of cells 101, 102, 103, as well as a plurality of base stations 111, 112, 113. Each base station 111, 112, 113 is adapted to serve user equipments (UE) 121, 122, 123 in its respective cell 101, 102, 103. Each base station is particularly responsible for the communication according to downlink (DL) and uplink (UP) with the user equipments located in its cell. The term base station is a generic term for defining an entity serving a cell, i.e. serving the user equipments located in a cell. The base station may be for example a base transceiver station (BTS) in a GSM network, a Node B in a UMTS network, or an eNodeB in LTE.

In the embodiment of FIG. 1, the base station 111 obtains channel state information (CSI) via pilot sequences sent by the UE 121 in the UL 131. Likewise, the base stations 112, 113 obtain respectively CSI via pilot sequences sent by the UEs 122, 123 in the respective UL 137, 134. The pilot sequences sent by the UEs 122, 123 cause pilot interferences at the base station 111. This is referred to for example by arrow 132 in FIG. 1. Similarly, the pilot sequences sent by the UEs 121, 122 cause pilot interferences at the base station 113. This is referred to by arrows 135, 138 in FIG. 1. Further on, the pilot sequences sent by the UEs 121, 123 cause pilot interferences at the base station 112. This is referred to by arrows 133, 136 in FIG. 1.

Figure 2:
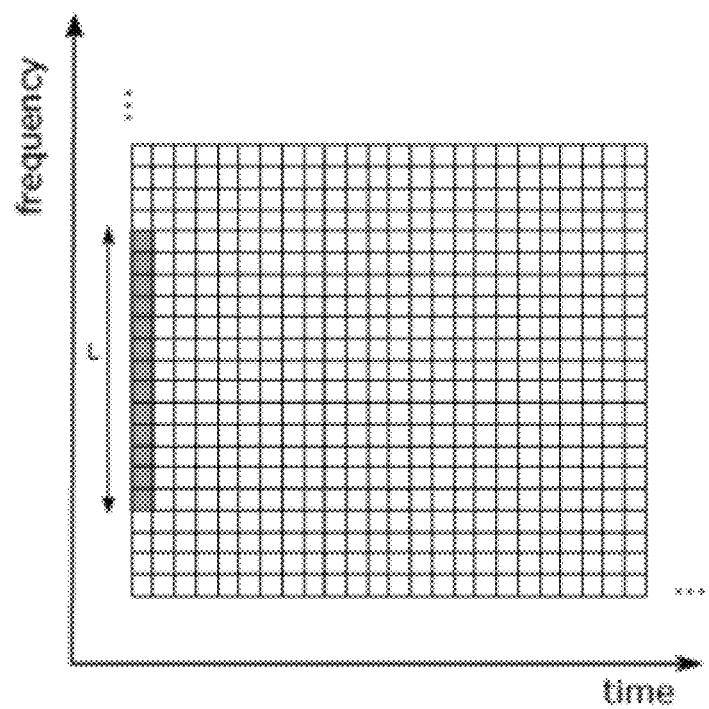
FIG. 2 shows a time-frequency grid with length L pilot sequences.

The communication system 100 according to the present application is for example a multi-cell orthogonal-frequency-division-duplex (OFDM) system with a total of N subcarriers. Additionally, K cooperating BSs/cells are considered, where a given bandwidth allocation consisting of L subcarriers is shared by all single-antenna users across the cells. Users in cell k send phase rotated versions of a sequence $s_k$ in the UL for the purpose of channel estimation, wherein the sequence $s_k$ is known to the corresponding BS k. FIG. 2 shows a corresponding time-frequency grid with length L pilot sequences, wherein the phase-rotated sequences are spread over the L subcarriers for k=1 ... K.

A phase rotation in the frequency domain corresponds to a cyclic shift in the time domain; thus, pilots inside a cell are separated in time. The phase rotations/cyclic shifts are designed to account for time dispersion due to frequency selectivity and ensure users remain orthogonal in time, as done in LTE systems for instance. For example, LTE systems support up to 8 cyclic shifts per symbol slot (66,67 µsec) in the UL, allowing 8 users to use the same symbol slot for pilot transmission. Correspondingly, the remaining pilot-interference corrupting the channel estimate of a given user comes from users in other cells transmitting their pilots using the same phase rotations as that given user. Without loss of generality, we therefore focus on users sending their corresponding sequences without any phase shifts. Each BS receives the sequence corresponding to the user in its own cell in addition to K−1 sequences from other cells. For the analysis, it is sufficient to consider one BS and one of its receive antennas. The received L dimensional frequency-domain signal at one of the antennas can be written as $$y = \sum_{k=1}^{K} S_k h_k + n \qquad (1)$$

Where $h_k$ is the frequency-domain L-dimensional CSI vector between the BS and user k at the subcarriers of interest, $S_k$ is the diagonal matrix containing the elements of $s_k$ on its main diagonal, and n is the additive white Gaussian noise vector whose elements are uncorrelated with mean zero and variance $\sigma_n^2$.

In the following embodiment, it is assumed that, similarly to LTE/LTE-A systems, cyclic-extended Zadoff-Chu (ZC) sequences are used. Nonetheless, the application is not limited to ZC sequences and covers other types of sequences as will be elaborated later on. Formally, the u-th element of the cyclic-extended (CE) ZC sequence of length L and root index r is defined as:

$$\tilde{a}_L^r(u) = \exp\left(\frac{j\pi r(u-1)_{\tilde{L}}((u-1)_{\tilde{L}}+1)}{\tilde{L}}\right), \qquad (2)$$

wherein u=1, ... , L.

Here, $\tilde{L}$ is the largest prime number smaller than L and $(x)_{\tilde{L}}$ denotes the modulo $\tilde{L}$ operation. User in cell k uses a CE ZC sequence of length L and root index $r_k$. Thus, the elements of $s_k$ read $$s_k(u) = \exp\left(\frac{j\pi r_k(u-1)_{\tilde{L}}((u-1)_{\tilde{L}}+1)}{\tilde{L}}\right), \qquad (3)$$

u=1, ... , L. Note that there exist $\tilde{L}-1$ root indices when sequences of length L are used. Thus, in practice, there exist enough distinguishable root indices and corresponding pilot sequences to be used across K cells. E.g., for the smallest bandwidth allocation in LTE which corresponds to L=12 subcarriers, 10 different root indices exist and 10 different pilot sequences can be used across up to 10 cells. It is assumed that the sequences are stored at the BS/UE, so that the knowledge of a given root index at a BS/UE is enough to construct the corresponding CE ZC sequence. Additionally, it is assumed for now that the K root indices are assigned randomly to the K cells.

The first part of the application covers exchanging sequence indices among BSs so that a given BS acquires the knowledge of the sequences used in the (K−1) neighboring cells that is required to perform channel estimation for all K UEs simultaneously. However, even with this knowledge, the BS cannot estimate the CSI of all UEs simultaneously, due to the fact that the CSI of all users corresponds to KL variables, while the observed vector at the BS (i.e., y) has size L.

Therefore, it is proposed to perform channel estimation in the time domain. If the channel impulse response (CIR) of each user has a maximum of T taps, then the received vector y can be alternatively written as $$y = \sum_{k=1}^{K} S_k \tilde{F} h_{k,td} + n \quad (4)$$

where the sub-Fourier matrix $\tilde{F}$ is obtained from the first T entries of the L rows of the Fourier matrix $F_N$ corresponding to the L subcarriers of interest, and $h_{k,td}$ is the CIR of user k, N being the total number of subcarriers available. In OFDM systems, the number of taps T is smaller than the number of subcarriers L, see e.g. I. Maniatis, T. Weber, A. Sklavos, Y. Liu, E. Costa, H. Haas, and E. Schulz, "Pilots for joint channel estimation in multi-user OFDM mobile radio systems" in Proc. of the 7th IEEE Int. Symp. on Spread-Spectrum Tech. \& Appl. (ISSSTA '02), vol. 1, pp. 44-48. The value of T can be determined by the base station according to the propagation scenario or estimated by some techniques which are out of the scope of the application.

This observation regarding the number of taps T being smaller than the number of subcarriers L is used to perform joint channel estimation. Namely, the BS can jointly estimate the CIR of all UEs if the number of assigned subcarriers per user is larger than the sum of user CIR taps (L>KT), and if the sequences of neighboring cells are known at the BS.

In this case, it is possible to define the following matrix M and vector $h_{td}$:

$$M \triangleq (S_1 \tilde{F}, \ldots, S_K \tilde{F}) \in \mathbb{C}^{L \times KT} \quad (5)$$

$$h_{td} = (h_{1,td}^H, \ldots, h_{K,td}^H)^H \in \mathbb{C}^{KT} \quad (6)$$

wherein M is a time frequency transfer function matrix and the second variable $h_{td}$ contains the stacked CIRs of all users.

Then, the BS can apply the following receive MSE filter G $$G = (M^H M + \sigma_n^2 C_{h_{td}}^{-1})^{-1} M^H \quad (7)$$

to get the stacked CIR estimate of all UEs:

$$\hat{h}_{td} = (M^H M + \sigma_n^2 C_{h_{td}}^{-1})^{-1} M^H y. \quad (8)$$

Here, $C_{htd}$ is the covariance matrix of $h_{k,td}$.

In other words, stacking the user CIRs according to the above-defined vector $h_{td}$ and defining the time frequency transfer function matrix M, y can be rewritten as:

$$y = M h_{td} + n \quad (9)$$

which is a linear system of L equations in KT unknowns. Given the BS knows the sequences $s_l$, $\forall l$, this becomes an estimation problem which yields exactly one solution for L≥KT. In case L<KT, the dominant taps of each user can be estimated and the remaining ones neglected. As the number of dominant interferers is usually limited, L≥KT holds for a wide range of scenarios.

It is to be noted that the knowledge of this covariance matrix is not necessary to implement the MSE filter. Indeed, though the MSE formulation and greedy selection algorithm depend on the covariance matrix $C_{htd}$, this quantity can be replaced by an identity matrix (or a scaled version thereof) in practice. The reason for that is two-fold. First, the CIRs of UEs in different cells are usually uncorrelated and therefore the covariance matrix $C_{htd}$ exhibits a block diagonal structure, where the non-zero block diagonal entries correspond to individual users' taps covariance matrices. Second, under a wide range of scenarios such as outdoor environments, the scatterers corresponding to a given user are uncorrelated. Thus, the taps of each user are uncorrelated and $C_{htd}$ is a diagonal matrix containing the tap powers of the K users on the main diagonal and zero elsewhere. In case the tap powers are not known at the BS, $C_{htd}$ can be replaced by a scaled identity matrix when running the greedy algorithm. The algorithm would still exhibit the desired performance, even with a faulty knowledge of the covariance matrix.

In the following, the greedy sequence selection algorithm according to the present application will be detailed.

So far, the MSE estimation filter at the BS was calculated assuming the sequences are fixed. A further MSE improvement occurs with sequence selection. Note that with the chosen estimation filter, the channel estimation MSE in the time-domain reads $$\epsilon = tr\left(\left(\frac{1}{\sigma_n^2} M^H M + C_{h_{td}}^{-1}\right)^{-1}\right) \quad (10)$$

which is implicitly a function the user pilot sequences via M, and tr(.) denotes the trace of a matrix. An optimal set of sequences would therefore minimize ∈. Unfortunately, such an optimization problem is of combinatorial nature, and yields no closed-form solution. A brute-force approach is not suitable in real-time applications as one has to go through a possibly huge number of combinations and might be already infeasible for more than 2 cells for large values of L. Therefore, we propose a greedy sequence selection algorithm to tackle this problem. Greedy algorithms are commonly used to find suboptimal solutions of combinatorial problems. In the context of sequence selection, a greedy algorithm selects the sequence $s_q$ with root index $r_q$ that minimizes the joint MSE at step q given sequences $\{s_1, s_2, \ldots, s_{q-1}\}$ are already chosen and fixed. At step q, the input-output transfer function $M_q$ is defined as $$M_q \triangleq (S_1 \tilde{F}, \ldots, S_q \tilde{F}) \quad (11)$$

and the joint MSE reads $$\epsilon_q = tr\left(\left(\frac{1}{\sigma_n^2} M_q^H M_q + C_{h_{1:q,td}}^{-1}\right)^{-1}\right) \quad (12)$$

where $C_{1:q,td}^{-1}$ is the covariance matrix of $(h_{1,td}^H, \ldots, h_{q,td}^H)^H$.

At the qth step of the greedy selection algorithm, one goes over $\tilde{L}-q$ possible sequence choices (as q−1 sequences are already assigned to the first q−1 users) and finds the one that results in the lowest MSE. It is summarized in Algorithm 1 in FIG. 3.

The greedy algorithm can take place in a central or a distributed manner. In a central implementation, a central controller would calculate all K sequences in the K cell network and signal the K root indices of the corresponding sequences to each BS/cell. The central controller additionally assigns the sequence to be used in each cell; however, this choice can be random. A decentralized implementation works as follows. In the first step, a given BS, say BS 1, randomly selects $s_1$ and signals its root index to the other (K−1) BSs. In the step q>=2, BS q implements step q of the greedy algorithm and calculates its sequence $s_q$ based on the sequences $\{s_1, s_2, \ldots, s_{q-1}\}$ that were already signaled by BSs who implemented steps 1 to q−1. It then signals the root index of $s_q$ to the other (K−1) BSs/cells. This signaling ensures all required sequences are known at the BSs.

Each BS needs to inform UEs in its own cell the chosen sequence index via a signaling procedure. This can be done, e.g. via a broadcast channel, or in a way similar to what the current LTE is doing. In this sense, UEs are also involved. In LTE, the UL sequence to be used by a UE depends on cell-specific (cell ID) and group-specific parameters, where a cell group consists of up to 30 cells. LTE Rel-11 and later offer the possibility to override these parameters and to set other "virtual cell and group parameters" (e.g. for the purpose of CoMP) through the Radio Resource Control (RRC) layer. This mechanism can be used to assign the selected pilot sequence indices to UEs. Concretely, after the greedy algorithm is finished, "virtual cell and group parameters" corresponding to the selected pilot sequence indices can be sent by a BS to the UEs attached to this BS. The UEs will then derive the selected pilot sequence indices from the "virtual cell and group parameters". Note that in LTE there is no mechanism available/standardized for exchanging the sequence indices among BSs.

Transmission/exchange of the selected sequences is needed when either 1) a cluster of cooperating cells is created by the network (e.g. according a first scenario detailed below), or 2) a new cell joins the cluster (e.g. according a second scenario detailed below). This can be done quickly and in real time. In fact, the signaling overhead is rather small, namely in the order of $K^2 \log2(\tilde{L})$. For the ZC sequences used in LTE, $\tilde{L}$=1022 for 10 MHz bandwidth. For K=6, L=1022, the messages to be exchanged among all K eNBs are equal to $6^2 \log2(1022)$ <=360 bits. As the message is small and the exchange among BSs is usually done through wired networks, it can be realized in real time. The message to be signaled from a BS to its UEs is as small as $\log2(\tilde{L})$ <=10 bits. The message exchange between BS and UEs can therefore be done in real time, as already realized in LTE (e.g. for CoMP).

In a first scenario of the greedy sequence selection according to the application, the network assigns a group of cells to cooperate and perform joint channel estimation.

In a first embodiment of the first scenario, the procedure is centralized. For example, for a network assigning a group of three cells to cooperate and perform joint channel estimation, the procedure is assumed by a central controller, as detailed in the followings:

Step 1: the central controller picks a random sequence s1.

Step 2: given s1, the central controller sets q=2, and finds the sequence s2 that minimizes the joint MSE, i.e. that minimizes $\in_q$, assuming two cells in the network. The covariance matrix in the above-mentioned definition of $\in_q$ can be approximated by a scaled identity matrix.

Step 3: Given s1 and s2, the central controller sets q=3 and finds the sequence s3 that minimizes the joint MSE $\in_q$ assuming three cells in the network. The covariance matrix in the definition of $\in_q$ can be approximated by a scaled identity matrix.

Step 4: The central controller assigns the obtained sequences s1, s2, and s3 randomly to the three cells. He additionally signals to each cell the sequences used in the neighboring two cells for the joint channel estimation to take place as defined by equation (8). In other words, it signals sequences s2 and s3 that are used in cells 2 and 3 to cell 1 and so on.

Then, the algorithm is over, as all needed sequences are signaled and joint MSE channel estimation in each cell can take place according to equation (8).

Figure 7:
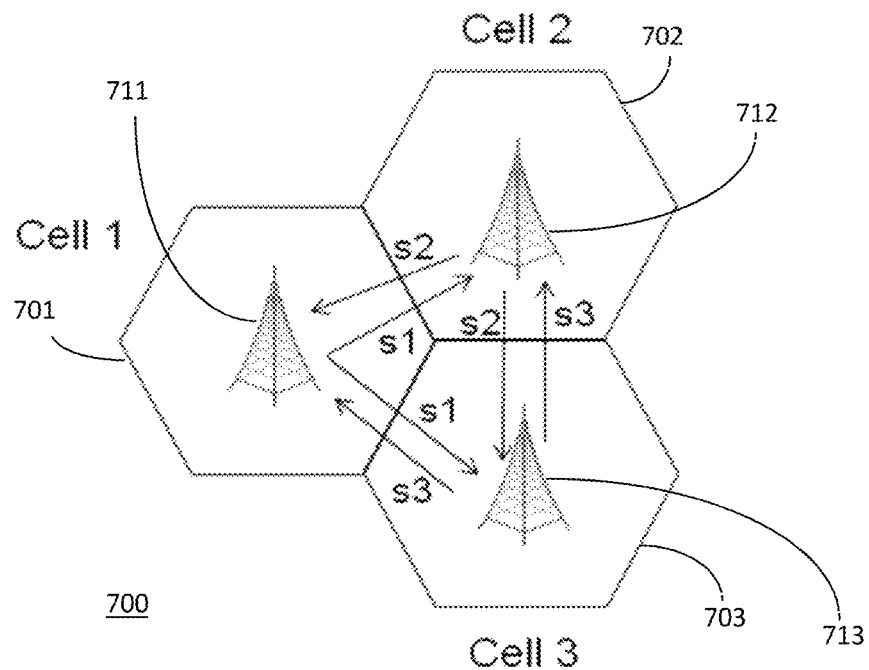
FIG. 7 shows an application scenario of the greedy sequence selection according to an embodiment of the present application.

A second embodiment of the first scenario is illustrated in FIG. 7 that shows a communication system 700 with three cells 701, 702, 703 and corresponding base stations 711, 712, 713. In the second embodiment of the first scenario, in case there is no central controller and the algorithm is performed in a distributed fashion, the procedure of the first embodiment can simply be changed as follows:

Step 1 takes place at cell 1 701: cell 1 chooses a random sequence s1 and signals s1 to cells 2 702 and 3 703.

Step 2 takes place at cell 2: given the knowledge of s1, cell 2 chooses its sequence s2 that minimizes the joint MSE $\in_q$ with q=2 according to the greedy procedure. It signals the chosen s2 to cells 1 and 3.

Step 3 takes place at cell 3: given the knowledge of s1 and s2, cell 3 chooses its sequence s3 according to the greedy procedure such that the joint MSE $\in_q$ with q=3 is minimized. It signals the chosen s3 to cells 1 and 2.

Then, the algorithm is over, as all needed sequences are signaled and the joint MSE channel estimation in each cell can take place according to equation (8).

In a second scenario of the greedy sequence selection according to the application, several cells cooperate and perform joint channel estimation according to the application and a further cell joins the cooperating cluster.

In a first embodiment of the second scenario, the procedure is centralized. For example, two cells 1 and 2 are cooperating and performing joint channel estimation. Cell 1 is aware of the sequence s2 used in cell 2 and vice versa. Cell 3 now joins the cooperating cluster. The following steps show how sequence s3 in cell 3 is calculated and what needs information to be exchanged assuming a centralized implementation.

Step 1: The central controller already knows the sequences s1 and s2 used in cells 1 and 2. Given this knowledge, it calculates the sequence s3 to be used in cell 3 using the greedy procedure.

Step 2: It signals s3 to cells 1, 2, and 3. Additionally, it signals sequences s1 and s2 to cell 3.

The procedure is over. With all necessary sequences signaled, the joint MSE channel estimation across the three cells can take place according to equation (8).

Figure 8:
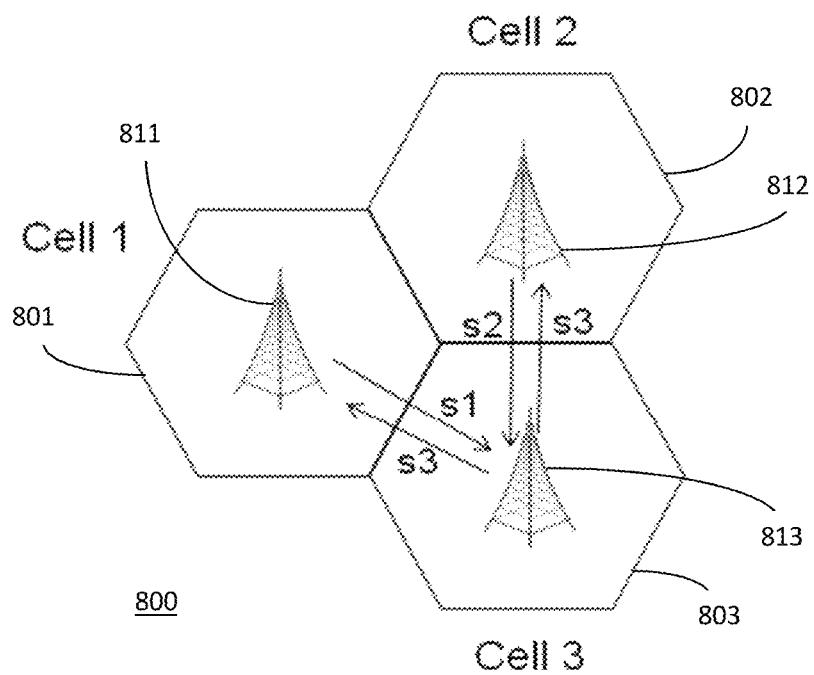
FIG. 8 shows an application scenario of the greedy sequence selection according to an embodiment of the present application.

A second embodiment of the second scenario is illustrated in FIG. 8 that shows a communication system 800 with three cells 801, 802, 803 and corresponding base stations 811, 812, 813. In the second embodiment of the second scenario, the calculation of the sequence of the cell joining the cooperating cluster and the information exchange are done in a decentralized manner, and comprise the following steps:

Step 1: Cells 1 801 and 2 802 signal sequences s1 and s2, respectively, to cell 3 who wants to join the cooperating cluster.

Step 2: Given the knowledge of s1 and s2, cell 3 calculates its sequence s3 to be used using the greedy procedure.

Step 3: Cell 3 signals the found s3 to cells 1 and 2.

Step 4: The procedure is over. With all necessary sequences signaled, the joint MSE channel estimation across the three cells can take place according to equation (8).

Even though the proposed method was illustrated for CE ZC sequences, it is clear that it is not limited to such sequences. The proposed method can cover any type of sequences that can be distinguished via a parameter such as the root sequence in the case of ZC sequences. Such a parameter is referred to as the sequence identification parameter.

Alternatives to ZC sequences further include M-Sequences, Gold sequences, or Kasami sequences. These sequences are, however, binary sequences consisting of 0's and 1's. Although there is no root index as in the ZC case, there do exist parameters (e.g. the random seeds) generating such sequences. Such parameters can be transmitted to the other BSs so that the corresponding sequence can be generated online. Alternatively, the whole sequences can be pre-generated, stored in BSs and/or UEs, and indexed. In this case, only the sequence indices need to be transmitted to the other BSs, i.e. need to be exchanged among the BSs.

In the followings, the performance and advantages of the present application will be detailed.

Link level simulations have been conducted to evaluate the performance of the proposed greedy selection algorithm. The main findings are as follows:

In comparison to the state of the art (e.g. LTE), the proposed exchange of root indices improves CSI quality considerably as joint channel estimation can be performed across the K cells and the CSI of the desired user can be then recovered with most interference suppressed.

Figure 5:
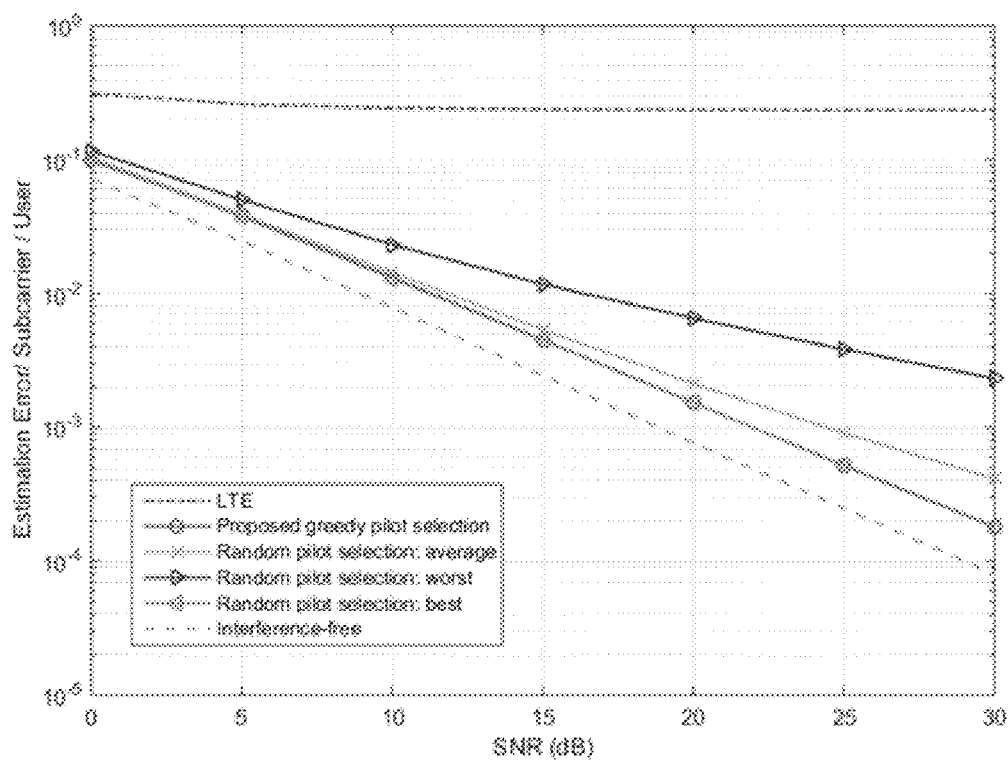
FIG. 5 shows an estimation error/subcarrier/user as a function of the SNR according to a further embodiment of the application.
Figure 6:
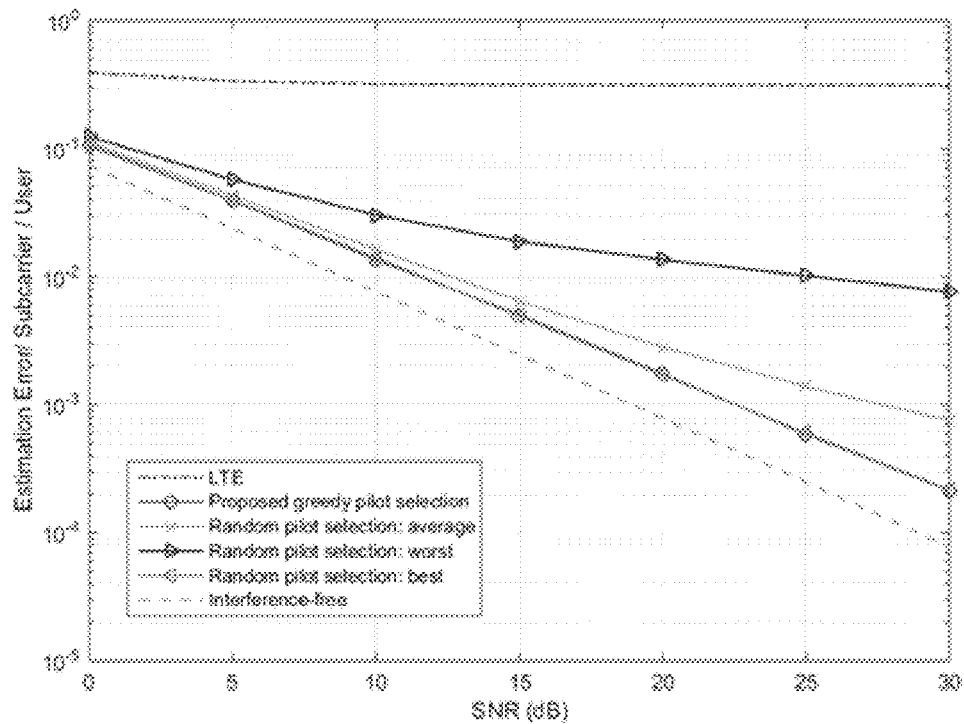
FIG. 6 shows an estimation error/subcarrier/user as a function of the SNR according to a further embodiment of the application.

The proposed greedy selection algorithm brings an additional 1 to 5 dB power gain on average in the medium to high SNR regime, compared to the case where sequences are randomly assigned by the network or randomly chosen by the cells. This is shown in FIGS. 4 to 6 illustrating a respective estimation error/subcarrier/user as a function of the SNR, wherein in the embodiment of FIG. 4 K=3 cells and L=120 subcarriers, in the embodiment of FIG. 5 K=4 cells and L=180 subcarriers with unequal tap powers, and in the embodiment of FIG. 5 K=5 cells and L=240 subcarriers.

The gain obtained by the greedy selection can be used to either further improve the CSI quality or reduce the pilot power transmission required to achieve a given estimation MSE. Additionally, the greedy selection ensures bad sets of sequences are not chosen. The performance of such sets can be 10 dB worse than the performance of the sequences returned by the greedy algorithm.

The greedy algorithm still exhibits the desired performance even with a faulty knowledge of the covariance matrix $C_{htd}$. FIG. 5 illustrates the results of such a scenario where the covariance matrix is replaced with an identity matrix scaled by 1/T.

In the followings, the differences and advantages of the present application are detailed.

In comparison to the state of the art (e.g. LTE), the proposed exchange of root indices improves the CSI quality at the BS considerably. An accurate CSI is necessary for the transmission of high order modulation schemes (e.g., 64-QAM or higher).

As joint channel estimation across the K cells is performed, the estimated CSI of users in neighboring cells can be used to perform UL or DL CoMP, which now according to the proposed method operate with better CSI quality and system performance.

When a new cell joins the cooperating cluster, only the sequence of that given cell has to be calculated, as shown e.g. in the second scenario. This makes the dynamic allocation and grouping of clusters possible in real time, in contrast to cases where, e.g., a brute force approach has to be used to calculate the sequences.

Such a brute force approach is less advantageous than the proposed greedy algorithm as it cannot be implemented in real-time but is nevertheless an alternative to the proposed greedy algorithm. Consider the scenario K=4 and L=240. Then we have $\hat{L}$=239 and $\hat{L}$−1=238 CE ZC sequences with distinguishable root indices. A brute-force approach necessitates going over 238×237×236×235>3×10$^9$ combinations to find the one that results in the lowest MSE. Such a brute-force search is possible, but the greedy selection is however preferred. Indeed, a greedy selection only necessitates going over 237+236+235=708 combinations only, which is easily performed in real time when the 4 cell cluster is created. Comparing the required number of combinations in both cases, the greedy selection algorithm results in a huge complexity reduction.

The present application has been described in conjunction with various embodiments as examples as well as implementations. However, other variations can be understood and effected by those persons skilled in the art and practicing the claimed application, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A controller for inter-cell pilot interference mitigation in a mobile network comprising a plurality of base stations for serving user equipments in respective cells, wherein a different set of pilot sequences is used by each base station for estimating channel state information, CSI, of user equipments served by said base station and the different set of pilot sequences used by each base station is identified by a sequence identification parameter, the controller comprising:

a transmitter adapted to transmit information about the set of pilot sequences used by a first base station of the network to at least a second base station of the network; and a processor adapted to select a first set of K sequence identification parameters ($r_k$) from a second set of possible sequence identification parameters, K corresponding to the number of the plurality of base stations and to the number of cells of the network, and adapted to assign a distinct sequence identification parameter from the first set to each of the K base stations of the network, wherein the processor is adapted to select the set of sequence identification parameters ($r_k$) by means of a greedy algorithm comprising:

an initial phase comprising selecting a first sequence identification parameter ($r_k$) from the second set, initializing the first set with the first sequence identification parameter, and removing the first sequence identification parameter from the second set, and a recursive phase comprising selecting the sequence identification parameter $r_q$ of the second set that minimizes a joint mean-square-error filter $E_q$, adding the selected sequence identification parameter $r_q$ to the first set, and removing the selected sequence identification parameter $r_q$ from the second set.

2. The controller according to claim 1,
wherein the set of pilot sequences used by each base station is identified by a sequence identification parameter, and
wherein the transmitter is adapted to transmit information about the set of pilot sequences used by the first base station to the second base station of the network in that:
the transmitter is adapted to transmit the sequence identification parameter identifying the set of pilot sequences used by the first base station to the second base station.

3. The controller according to claim 2,
wherein the set of pilot sequences used by each base station is composed of Zadoff-Chu sequences comprising a root sequence ($s_k$) and cyclically shifted versions of the root sequence, said root sequence ($s_k$) being identified by a root index ($r_k$),
wherein the transmitter is adapted to transmit the sequence identification parameter identifying the set of pilot sequences used by the first base station to the second base station in that:
the transmitter is adapted to transmit the root index ($r_k$) identifying the root sequence ($s_k$) used by the first base station to the second base station.

4. The controller according to claim 2,
wherein the set of pilot sequences used by each base station is composed of M-Sequences, Gold sequences or Kasami sequences, and
wherein the sequence identification parameter identifies the set of pilot sequences used by the first base station in that the set of pilot sequences used in the first base station can be generated from the sequence identification parameter.

5. The controller according to claim 2,
wherein the transmitter is adapted to transmit the sequence identification parameter identifying the set of pilot sequences used by the first base station to the second base station in that:
the transmitter is adapted to transmit indices of the set of pilot sequences used by the first base station to the second base station.

6. The controller according to claim 1,
wherein the joint mean-square-error filter $E_q$ is defined as:

$$\epsilon_q = tr\left(\left(\frac{1}{\sigma_n^2}M_q^H M_q + C_{h_{1:q,td}}^{-1}\right)^{-1}\right)$$

wherein q corresponds to the q-th step of the recursive phase, $M_q$ is a time frequency transfer function M defined by:

$$M_q \triangleq (S_1\tilde{F}, \ldots, S_q\tilde{F})$$

$S_k$ is a diagonal matrix containing the elements of the respective sequence (sk) identified by the sequence identification parameter, and $\tilde{F}$ is a matrix comprising first T entries of the L rows of a Fourier matrix $F_N$ corresponding to the L subcarriers occupied by the pilot sequences, T being a number of taps, and wherein $C^{-1}_{h_{1_{q,td}}}$ is the inverse of the covariance matrix of $(h^H_{1,td}, \ldots h^H_{q,td})^H$, $h_{k,td}$ is a channel impulse response, CIR, of a user equipment served by a base station k, of length T, $\sigma_n^2$ is the power of the additive noise present at the processor, and tr(.) denotes the trace of a matrix.

7. A base station for serving user equipments in a cell of a mobile network,
wherein the network comprises further base stations for serving user equipments in respective further cells,
wherein a different set of pilot sequences is used by each base station for estimating channel state information, CSI, of user equipments served by said base station, the base station comprising:
a receiver adapted to receive information about the sets of pilot sequences used respectively by further base stations of the network, wherein the set of pilot sequences used by each base station is identified by a sequence identification parameter, and the receiver is adapted to receive the sequence identification parameters respectively identifying the sets of pilot sequences used by the further base stations;
wherein the receiver is further adapted to receive an L-dimensional frequency-domain signal y comprising pilot sequences received from user equipments located in the cell served by the base station and in the further cells, wherein L is the length of the pilot sequences which are spread over L subcarriers, the base station comprising:
a processor adapted to perform, for the user equipments located in the cell served by the base station and in the further cells, a joint channel estimation in the time domain;
wherein the processor is adapted to generate, for each received sequence identification parameter (rk), the sequence ($s_k$) of length L identified by the sequence identification parameter ($r_k$), wherein the processor is adapted to generate a time frequency transfer function M defined by:

$$M_q \triangleq (S_1\tilde{F}, \ldots, S_K\tilde{F})$$

wherein $S_k$ is a diagonal matrix containing the elements of the respectively generated sequence (sk), and
$\tilde{F}$ is a matrix comprising the first T entries of the L rows of a Fourier matrix $F_N$ corresponding to the L subcarriers occupied by the pilot sequences, T being a number of taps, wherein the processor is adapted to perform the joint channel estimation by solving a linear system of L equations defined by:

$$Y = Mh_{td} + n$$

wherein y is the frequency-domain signal received by the receiver, $h_{td}$ is defined as:

$$h_{td} = (h^H_{1,td}, \ldots h^H_{K,td})^H$$

wherein K is the number of cells comprising the cell served by the base station and the further cells, $h_{k,td}$ is a channel impulse response, CIR, of a user equipment served by a base station k.

8. The base station according to claim 7,
wherein the set of pilot sequences used by each base station is composed of Zadoff-Chu sequences comprising a root sequence ($s_k$) and cyclically shifted versions of the root sequence, said root sequence ($s_k$) being identified by a root index ($r_k$), wherein the receiver is adapted to receive the sequence identification parameters respectively identifying the sets of pilot sequences used by the further base stations of the network in that:

the receiver is adapted to receive the root indices (rk) identifying the respectively root sequence ($s_k$) used by the further base stations.

9. The base station according to claim 7, wherein the set of pilot sequences used by each base station is composed of M-Sequences, Gold sequences or Kasami sequences, and wherein the sequence identification parameter identifies the set of pilot sequences used by a given base station in that the set of pilot sequences used in the given base station can be generated from the sequence identification parameter.

10. The base station according to claim 7, wherein the processor is adapted to perform the joint channel estimation by optimizing an estimation filter G defined as:

$$G=(M^H M+\sigma_n^2 C_{h_{td}}^{-1})^{-1} M^H$$

wherein $C_{h_{td}}$ is the covariance matrix of $h_{k,td}$, and $\sigma_n^2$ is the power of the additive noise present at a processor of the further base stations.

11. The base station according to claim 10, further comprising a transmitter adapted to broadcast information about the set of pilot sequences used by the base station to the user equipments served by the base station.

12. A method of inter-cell pilot interference mitigation in a mobile network comprising a plurality of base stations for serving user equipments in respective cells, wherein a different set of pilot sequences is used by each base station for estimating channel state information, CSI, of user equipments served by said base station and the different set of pilot sequences used by each base station is identified by a sequence identification parameter, the method comprising:

transmitting information about the set of pilot sequences used by a first base station of the network to at least a second base station of the network;

selecting a first set of K sequence identification ($r_k$) from and a second set of possible sequence identification parameters, K corresponding to the number of the plurality of base stations and to the number of cells of the network, and adapted to assign a distinct sequence identification parameter from the first set to each of the K base stations of the network;

selecting the set of sequence identification parameters ($r_k$) by means of a greedy algorithm, the algorithm comprising:

an initial phase comprising selecting a first sequence identification parameter (rk) from the second set, initializing the first set with the first sequence identification parameter, and removing the first sequence identification parameter from the second set, and a recursive phase comprising selecting the sequence identification parameter ($r_q$) of the second set that minimizes a joint mean-square-error filter $\epsilon_q$, adding the selected identification parameter $r_q$ to the first set, and removing the selected sequence identification parameter $r_q$ from the second set.

13. A method for inter-cell pilot interference mitigation in a mobile network, wherein the network comprises a plurality of base stations for serving user equipments in respective further cells, wherein a different set of pilot sequences is used by each base station for estimating channel state information, CSI, of user equipments served by said base station, the method comprising:

a base station of the mobile network receiving information about the sets of pilot sequences used respectively by further base stations of the mobile network, wherein the set of pilot sequences used by each base station is identified by a sequence identification parameter, and the receiver is adapted to receive the sequence identification parameters respectively identifying the sets of pilot sequences used by the further base stations;

wherein the receiver is further adapted to receive an L-dimensional frequency-domain signal y comprising pilot sequences received from user equipments located in the cell served by the base station and in the further cells, wherein L is the length of the pilot sequences which are spread over L subcarriers, the base station comprising:

a processor adapted to perform, for the user equipments located in the cell served by the base station and in the further cells, a joint channel estimation in the time domain;

wherein the processor is adapted to generate, for each received sequence identification parameter (rk), the sequence ($s_k$) of length L identified by the sequence identification parameter ($r_k$), wherein the processor is adapted to generate a time frequency transfer function M defined by:

$$M_q \triangleq (S_1 \tilde{F}, \ldots, S_K \tilde{F})$$

wherein $S_k$ is a diagonal matrix containing the elements of the respectively generated sequence (sk), and $\tilde{F}$ is a matrix comprising the first T entries of the L rows of a Fourier matrix $F_N$ corresponding to the L subcarriers occupied by the pilot sequences, T being a number of taps, wherein the processor is adapted to perform the joint channel estimation by solving a linear system of L equations defined by:

$$Y=Mh_{td}+n$$

wherein y is the frequency-domain signal received by the receiver, $h_{td}$ is defined as:

$$h_{td}=(h^H_{1,td}, \ldots, h^H_{K,td})^H$$

wherein K is the number of cells comprising the cell served by the base station and the further cells, $h_{k,td}$ is a channel impulse response, CIR, of a user equipment served by a base station k.

* * * * *